(12) United States Patent
Diesner et al.

(10) Patent No.: US 11,999,578 B2
(45) Date of Patent: Jun. 4, 2024

(54) PALLETIZING APPARATUS AND METHOD FOR STACKING PACKAGES

(71) Applicant: KHS GMBH, Dortmund (DE)

(72) Inventors: Stefan Diesner, Leon-Rot (DE); Hans-Werner Holzer, Dittelsheim-Hessloch (DE); Stefan Helfrich, Heppenheim (DE); Adil Kuscu, Worms (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 17/795,561

(22) PCT Filed: Feb. 10, 2021

(86) PCT No.: PCT/EP2021/053140
§ 371 (c)(1),
(2) Date: Jul. 27, 2022

(87) PCT Pub. No.: WO2021/170403
PCT Pub. Date: Sep. 2, 2021

(65) Prior Publication Data
US 2023/0085637 A1 Mar. 23, 2023

(30) Foreign Application Priority Data
Feb. 25, 2020 (DE) ..................... 10 2020 104 859.9

(51) Int. Cl.
*B65G 57/14* (2006.01)
*B65G 47/24* (2006.01)
*B65G 57/03* (2006.01)

(52) U.S. Cl.
CPC ........... *B65G 57/035* (2013.01); *B65G 47/24* (2013.01); *B65G 57/14* (2013.01)

(58) Field of Classification Search
CPC ...... B65G 57/035; B65G 57/14; B65G 57/18; B65G 57/24; B65G 57/22; B65G 25/04
(Continued)

(56) References Cited

U.S. PATENT DOCUMENTS 3,529,732 A * 9/1970 Wayne ................... B65G 57/24
198/799
4,214,848 A 7/1980 Verwey et al.
(Continued)

FOREIGN PATENT DOCUMENTS

CN 104709720 A 6/2015
DE 2500077 A * 7/1976 ............. B65G 57/24
(Continued)

*Primary Examiner* — Gregory W Adams
(74) *Attorney, Agent, or Firm* — Laurence A. Greenberg; Werner H. Stemer; Ralph E. Locher

(57) ABSTRACT

A palletizing apparatus and a method for stacking packages on a load carrier. The palletizing apparatus has a stacking location for palletizing the packages and at least two supply stations, which are in conveying connection with the stacking location and each have an intermediate carrier formed for receiving the packages. It is possible for the intermediate carriers to be vertically adjusted by a motor at least to some extent independently of one another between a low-level position and a high-level position. In order to make a rapid palletizing cycle possible, provision is made for the intermediate carriers to be horizontally adjustable by a motor-drive independently of one another between a starting position and an end position. The intermediate carriers are arranged at the supply stations for adjustment in a collision-free manner in opposite adjustment directions between a receiving position and a transfer position.

14 Claims, 9 Drawing Sheets

(58) Field of Classification Search
USPC ... 414/792.8, 793, 793.1, 793.4, 794.1, 799, 414/791.6
See application file for complete search history.

(56) References Cited

U.S. PATENT DOCUMENTS

| | | | | |
|---|---|---|---|---|
| 4,290,723 | A * | 9/1981 | Johansson | B65G 57/035 |
| | | | | 271/189 |
| 6,655,902 | B2 * | 12/2003 | Dube | B65G 57/035 |
| | | | | 414/789.5 |
| 8,613,585 | B2 * | 12/2013 | Johansson | B65G 57/18 |
| | | | | 414/799 |
| 9,643,801 | B2 | 5/2017 | Beer et al. | |
| 9,731,916 | B2 | 8/2017 | Kollmuss et al. | |
| 10,017,334 | B2 * | 7/2018 | Raybon | B65G 25/04 |
| 10,053,264 | B2 | 8/2018 | Roos et al. | |
| 2015/0314455 | A1 * | 11/2015 | Morency | B65G 63/002 |
| | | | | 414/800 |
| 2017/0043986 | A1 * | 2/2017 | Ducharme | B65G 57/00 |

FOREIGN PATENT DOCUMENTS

| | | | | |
|---|---|---|---|---|
| DE | 2711677 | A1 * | 9/1978 | B65G 57/03 |
| DE | 3300329 | A1 | 7/1984 | |
| DE | 102010011534 | A1 | 9/2011 | |
| DE | 102012204030 | A1 | 9/2013 | |
| DE | 102015105125 | A1 | 10/2016 | |
| DE | 102016207157 | A1 | 11/2016 | |
| DE | 102018109559 | A1 | 10/2019 | |
| EP | 0257447 | A2 | 3/1988 | |
| EP | 1864923 | A1 * | 12/2007 | B65G 57/03 |
| EP | 2112101 | A1 | 10/2009 | |
| EP | 2881347 | A1 | 6/2015 | |
| NL | 8801528 | A | 6/1988 | |

* cited by examiner

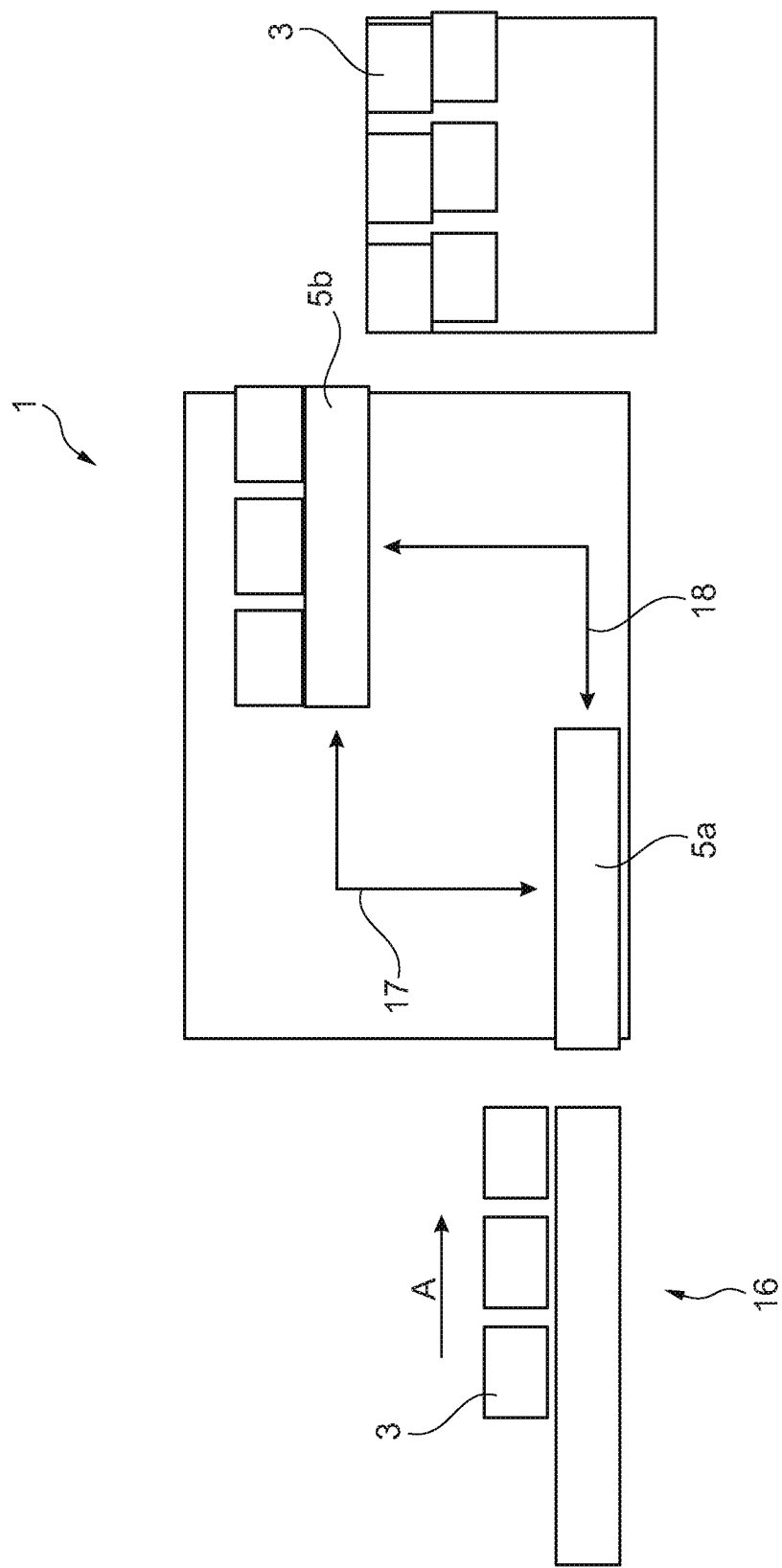

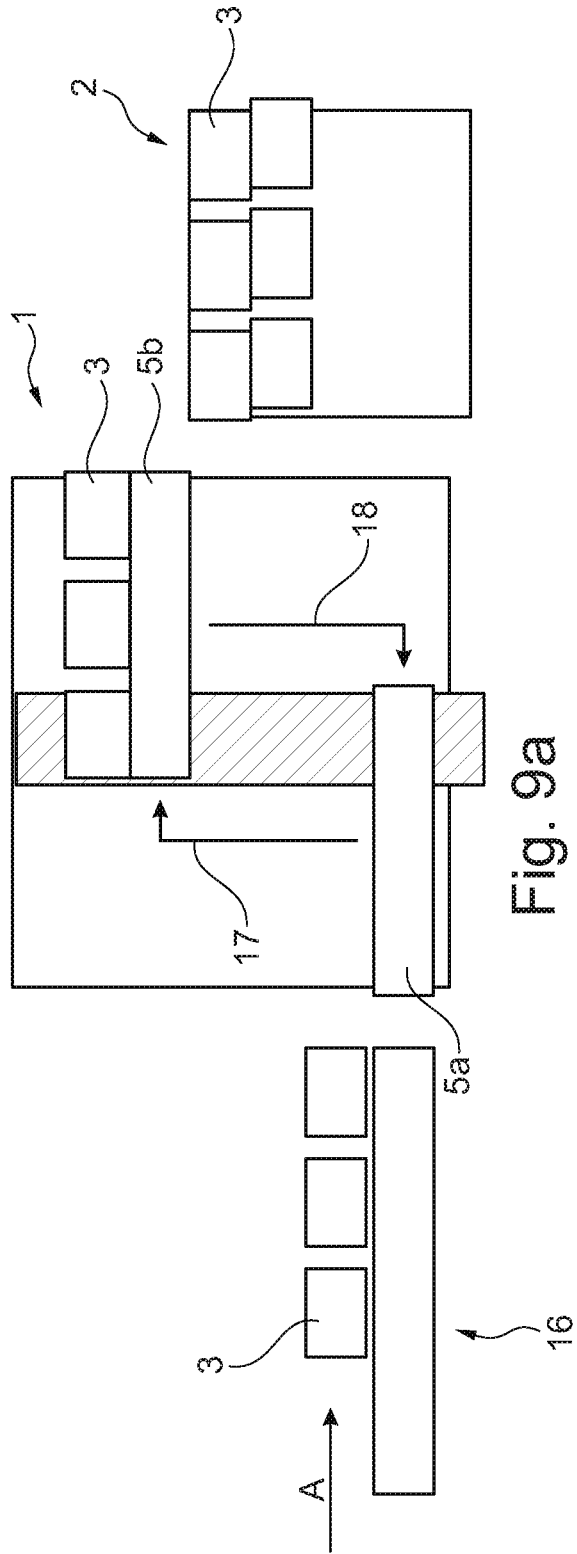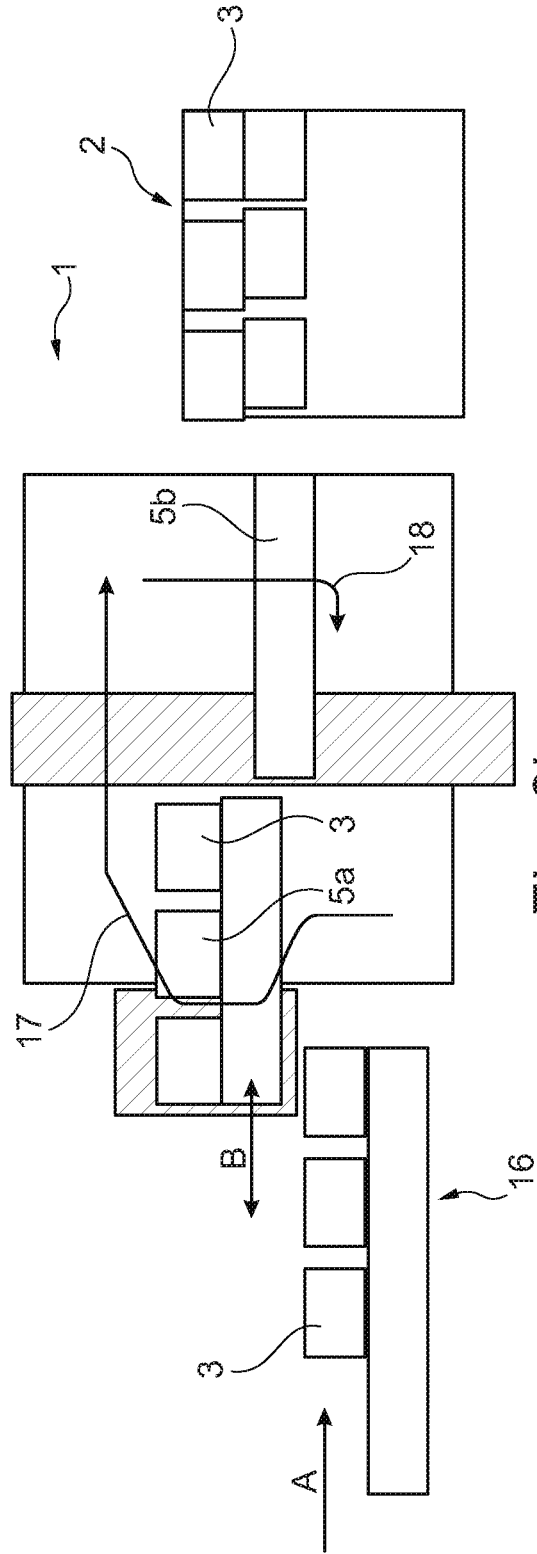

PALLETIZING APPARATUS AND METHOD FOR STACKING PACKAGES

FIELD AND BACKGROUND OF THE INVENTION

The invention relates to a palletizing apparatus for stacking packages on a load carrier, with
- a stacking location for palletizing the packages, and
- at least two supply stations which are in conveying connection with the stacking location, each having an intermediate carrier formed for receiving the packages, which can be adjusted vertically by means of a motor at least in sections, independently of one another, between a low-level position and a high-level position, The invention further relates to a method for stacking packages on a load carrier arranged at a stacking location, making use of such a palletizing apparatus.

For palletizing packages, such as parcel goods or bundle groups, the layers which are usually prepared beforehand and/or assembled in package units, which are capable of being palletised, at a grouping station, and are conveyed by means of a transport unit to a palletizing apparatus. The palletizing apparatus is configured in such a way as to carry out lifting movements, in order to arrange the packages conveyed to the palletizing apparatus at different heights at a desired location, for example on a pallet arranged at a stacking location. In order to stack the packages at the stacking location at a particular height, it is necessary for the palletizing apparatus to carry out, related to the location of use, vertical displacement of the packages in order to adjust to the desired height, as well as horizontal displacement of the packages in order to achieve their intended arrangement on the stacking location.

A known palletizing apparatus of the type referred to in the preamble is described, for example, in EP 2 881 347 B1, in which the packages are taken up by means of a transfer station and transferred to a loading station, from which the packages can be deposited at a predetermined point at the stacking location by opening a carrying base of the loading station. Due to the use of a transfer station and a loading station, such palletizing apparatus have the disadvantage of a palletizing cycle which is limited in its speed.

SUMMARY OF THE INVENTION

The invention is based on the object of providing a palletizing apparatus and a method for stacking packages with a palletizing apparatus which allow for a rapid palletizing cycle. The invention solves the object by way of a palletizing apparatus as claimed, and a method with the features as claimed. Advantageous further embodiments of the invention are provided in the dependent claims.

The palletizing apparatus according to the invention comprise two supply stations, each with an intermediate carrier, which are each adjustable between a low-level position and a high-level position, wherein this relates to end positions of the intermediate carrier in the vertical direction. Within the framework of the present application, the expressions 'vertical' and 'horizontal' relate to the usual position of use of the palletizing device, in which this stands upright on an essentially flat substrate, running horizontally, and therefore runs along a 'horizontal' adjustment essentially parallel to the substrate, and a 'vertical' adjustment perpendicular to the substrate.

As well as the vertical adjustability of the intermediate carrier, there is the possibility of packages being taken over from a transport device upstream of the palletizing apparatus, which delivers the packages, in a receiving position adjacent to the transport unit, which is located, in the vertical direction, between the low-level position and the high-level position. In order to stack the packages at a stacking location, for example on a pallet arranged at the stacking location, the packages can then, due to the vertical adjustability, be deposited one after another in transfer positions on the stacking location, ideally at transfer positions which vary from one another in height.

According to the invention, in order to carry out adjustments between the receiving position and the transfer position, the intermediate carriers of the two supply stations can also be adjusted in the horizontal direction between a starting position arranged horizontally to the transport unit, and an end position arranged horizontally to the stacking location. In the starting position, the respective intermediate carrier is aligned horizontally in relation to the transport unit in such a way that, in particular after a previous vertical alignment, the packages being conveyed by the transport unit can be arranged on the intermediate carrier. Conversely, in the horizontal end position, the intermediate carriers are arranged horizontally in relation to the stacking location in such a way that the packages arranged on the intermediate carrier can be deposited in a predetermined position on the stacking location.

In order to ensure a rapid palletizing cycle, according to the invention the two intermediate carriers of the two supply stations carry out opposed adjustment movements. That is to say, while a first intermediate carrier provided with a package is moved into the transfer position, coming from the receiving position, a second, emptied, intermediate carrier is moved from the transfer position into the receiving position. In this situation, the receiving position represents the position of the intermediate carrier, in which these are arranged horizontally in the starting position, and are arranged vertically in relation to the transport unit in such a way that a package can be taken up on the intermediate carrier. In turn, the transfer position of the intermediate carriers represents the position in which these are in the horizontal end position, and are positioned vertically in the region between the low-level position and the high-level position in relation to the stacking location in such a way that a transfer of the packages can take place at the stacking location at the predetermined height.

The opposed adjustment movement of the intermediate carriers of the supply stations is carried out in such a way that they can be moved past one another without any risk of collision, wherein it is ensured that the two intermediate carriers can adopt receiving positions and transfer positions at the transport unit and the stacking location which concur with one another, such that it is ensured that these can reliably receive the packages and transfer them at the stacking location. The movement past each other without collision takes place preferably solely due to a displacement of the supply stations or intermediate carriers respectively horizontally along the transport direction and a vertically directed displacement of the supply stations and intermediate carriers respectively in relation to one another. The movement without collision takes place preferably without a horizontal displacement of the intermediate carriers directed transversely to the direction of transport.

The configuration of the palletizing apparatus according to the invention, with at least two supply stations, each comprising an intermediate carrier, and their opposed adjustability, free of any collision, between the receiving position and the transfer position, ensures a particular rapid palletizing cycle, as a result of which the packages which are to be processed can be assembled to form pallets, and can then be transported onwards. The possibility of arranging the intermediate carriers in concordant receiving and transferring positions ensures in this situation an interference-free takeover by the transport unit and also palletizing at the stacking location.

The configuration of the supply station is in principle freely selectable, in such a way that the intermediate carriers can be adjusted vertically between the high-level position and the low-level position and can be moved horizontally between the starting position and the end position. According to one particularly advantageous embodiment of the invention, however, provision is made for the supply stations to comprise in each case a receiving device, which
- is configured to provide a movable arrangement of the intermediate carriers horizontally between the starting position and the end position, and
- to provide vertical movement of the intermediate carrier between the low-level position and the high-level position, at a guide unit of the palletizing apparatus.

According to this embodiment of the invention, the supply stations each comprise a receiving device, at which the intermediate carriers are arranged so as to be movable horizontally. The movement at the supply stations preferably takes place in this situation by means of a motor drive, wherein preferably suitable drive means, such as drive motors, are arranged at the receiving devices, which cause a movement of the intermediate carrier in the horizontal direction in relation to the receiving device.

According to this further embodiment of the invention, the vertical movement of the intermediate carriers is achieved by means of an arrangement of the receiving devices of the supply stations at a guide unit, at which the receiving devices can be adjusted independently of one another vertically between the low-level position and the high-level position. The adjustment preferably takes place in this situation likewise by means of suitable motor drives.

By means of the vertical movement of the receiving device at the guide unit, and the horizontal movement of the intermediate carriers in relation to the receiving devices, the intermediate carriers can therefore be adjusted into any desired position between a receiving position and the transfer position. A positioning of the intermediate carrier in the vertical direction takes place in this situation by means of a corresponding alignment of the receiving device at the guide unit, while a positioning of the intermediate carrier in the horizontal direction takes place by means of a corresponding movement in relation to the receiving device. This configuration of the invention is characterized in that it can be arranged particularly easily and compactly, makes reliable collision-free operation possible, and in that situation ensures a high pallet cycle.

The arrangement of the guide unit for the vertical movement of the receiving device is in this situation in principle freely selectable. According to one advantageous embodiment of the invention, however, provision is made for the guide unit to comprise two separate column devices, each assigned to a receiving device and comprising at least one carrying column. The use of column devices with at least one carrying column in each case allows for a particularly stable and reliable arrangement of the receiving devices at the carrying columns, such that these can be adjusted vertically. In this situation, by means of the usual perpendicular alignment of the carrying columns, the direction of adjustment is reliably determined and set. The carrying columns additionally ensure a simple and reliable transfer of the forces imposed by the packages onto the intermediate carriers. In this situation, moreover, by means of the number of carrying columns of the column device the stability can be additionally increased if the need arises, wherein the receiving device can then be guided in its vertical movement at two or more carrying columns.

The arrangement of the guide units, in particular of the carrying columns of the column device, is in principle freely selectable. According to one advantageous embodiment of the invention, however, provision is made for the column device, in particular the carrying columns, seen transversely to the transport direction, to be arranged opposite one another. According to this embodiment of the invention, the arrangement of the column devices, in particular of the carrying columns, is provided opposite the transport direction of the packages in such a way that, starting from the receiving position into the transfer position, they are arranged opposite one another laterally, next to the intermediate carriers. According to this advantageous embodiment of the invention, the column devices, seen transversely to the transport direction of the packages, are arranged opposite one another, adjacent to the transport direction determined and set by the horizontal adjustment movement of the intermediate carriers. In each case, at least one carrying column of the column device serves in this situation to receive a receiving device, which are therefore adjustable vertically, opposite one another, between the low-level position and the high-level position.

Positioning carried out on one side of the receiving devices, namely at opposing carrying columns, ensures in this situation, in a particular manner, that the receiving devices can be moved past one another, free of collision, during their opposed movements between the receiving position and the transfer position. In order to avoid a collision between the intermediate carriers in the region between the receiving position and the transfer position, necessary avoidance movements take place in this situation by means of a horizontal adjustment of the intermediate carriers at the receiving stations, such that, in a particularly simple and reliable manner, a collision-free opposed adjustment of the two intermediate carriers is ensured.

Positioning the packages on the intermediate carriers in the receiving position, and transfer of the packages to the stack location in the transfer position can in principle take place in any desired manner. An arrangement of the packages on the intermediate carrier in the receiving position can be put into effect, for example, by means of a transport unit upstream of the palletizing apparatus. According to a further embodiment of the invention, however, provision is made for the receiving devices to comprise transfer means for the horizontal movement of the packages in relation to the intermediate carriers.

The use of transfer means makes it possible, independently of any supplementary devices, for the packages to be arranged in the intended manner both in the receiving position on the intermediate carrier as well as in the transfer position so as to be transferred from the intermediate carrier to the stacking position. According to a particular advantageous configuration, provision is made in this situation for the transfer means to comprise a transport belt and/or transport rollers arranged at the intermediate carrier, which are preferably connected to a drive unit. The use of driven transport belts or transport rollers is characterized in this situation in that these allow, in a particularly simple and reliable manner, for a horizontal movement of the packages on the intermediate carrier, such that these are taken over in a reliable manner from a transport unit onto the intermediate carrier in the receiving position, and can be transferred in the transfer position to the stacking location in a simple manner. For particularly reliable operation, in particular with a very rapid palletizing cycle, stops or a clamping device are provided, in order to prevent a position change in the arrangement of the packages during the supply to the stacking location. Ideally, the arrangement of the packages does not change on the transport segment from the grouping station until they are deposited.

According to a further configuration of the invention, provision is made for the transfer means to comprise a clearing element, which can be adjusted parallel to the intermediate carrier and which can be brought into engagement with a package arranged on the intermediate carrier, which is preferably connected to a drive unit. According to this configuration of the invention, the palletizing apparatus comprises a clearing element which is arranged, for example, or can be positioned in such a way, such that it comes into engagement with a package arranged on the intermediate carrier, and moves it horizontally opposite the intermediate carrier in the direction of the stacking location. The use of a clearing element makes it possible in this situation for the intermediate carrier to be configured as particularly simple and compact. In addition to this, by a predetermined positioning of the clearing element it can be ensured that the packages are transferred to the stacking location in a reliable manner.

Characterising for the method for stacking packages on a load carrier arranged at the stacking location, making use of a palletizing apparatus of the type described heretofore in accordance with the invention or further developed, is the fact that, with the arrangement of the first intermediate carrier in the receiving position and the second intermediate carrier in the transfer position, a package which may be present is supplied from the second intermediate carrier to the stacking location, and a package is arranged on the first intermediate carrier, next the first intermediate carrier is driven by a motor in the direction onto the transfer position, and, at the same time, the second intermediate carrier, driven by a motor, is moved in the direction onto the receiving position, wherein the first and the second intermediate carriers are moved past one another free of any collision.

According to the method according to the invention, both intermediate carriers adopt alternately the concordant receiving position and transfer position. A movement of the first intermediate carrier out of the receiving position into the transfer position takes place in this situation simultaneously with the opposed movement of the second intermediate carrier out of the transfer position into the receiving position. The method according to the invention makes provision in this situation that the intermediate carriers are moved past one another free of collision in the region between the receiving position and the transfer position, as a result of which a rapid palletizing cycle can be achieved, since the movement of the two intermediate carriers between the transfer position and receiving position has no influence on the movement speed. This can be freely selected, wherein, as well as the same speed in both directions, an adjustment at different speeds can also be selected, as a result of which, for example, a movement of an empty intermediate carrier out of the transfer position into the receiving position takes place faster than the movement of an intermediate carrier occupied by a package.

The configuration of the movement of the intermediate carriers between the receiving position and the transfer position, i.e., the determining of the corresponding movement path is in this case in principle freely selectable.

According to a first embodiment of the invention, however, provision is made for the intermediate carriers on a first movement path to be moved out of the receiving position into the transfer position, and on a second movement path out of the transfer position into the receiving position, wherein the first movement path and the second movement path do not have any intersections. According to this configuration of the invention, the method makes provision for two movement paths, the run courses of which do not have any points of intersection whatever, such that the intermediate carriers are moved on a circular track comprising two sections. In this situation, on the first movement path a movement takes place out of the receiving position into the transfer position, while, by contrast, on the second movement path the movement takes place from the transfer position into the receiving position. The intermediate carriers therefore circulate in the form of a paternoster system between the receiving position and the transfer position, wherein the transfer position is adjusted successively in height if necessary, so as to correspond to the rising pallet height.

According to a further configuration of the invention, provision is made for the first intermediate carrier to be moved on a first movement path both out of the transfer position into the receiving position as well as out of the receiving position into the transfer position, and the second intermediate carrier on a second movement path both out of the transfer position into the receiving position as well as out of the receiving position into the transfer position, wherein the movement paths do not have any points of intersection. According to this configuration of the invention, two movement paths are provided for, on which the intermediate carriers are moved to and fro, and do not have any overlaps whatsoever. In this situation, on the first movement path a movement takes place of the first intermediate carrier out of the receiving position into the transfer position, and on the same movement path out of the transfer position into the receiving position. Conversely, on the second movement path the movement takes place of the second intermediate carrier both out of the receiving position into the transfer position as well as out of the transfer position into the receiving position, such that, by means of this configuration, the movement path can reliably avoid a collision. Vertical adjustment of the transfer position takes place in this situation corresponding to the stack height which has been reached of the packages on the stacking location, wherein provision can also be made for a fixed transfer position as a simple variant.

According to an alternative configuration of the invention, provision is made for the first and second movement paths are congruent in the region of the transfer position and/or receiving position, and the intermediate carriers are guided past one another free of collision in the region located in between. According to this configuration of the invention, the first and second movement paths have a congruent movement run in the region around the receiving position as well as in the region around the transfer position. In this situation, in order to avoid a collision with an opposed movement of the intermediate carriers, provision is made according to the invention for the intermediate carriers to be guided past one another in the region between the transfer position and the receiving position, wherein, for this purpose, for example one or both intermediate carriers carry out diversionary movements in the horizontal direction. The horizontal movement takes place in this situation along the transport direction of the intermediate carriers between the receiving position and the transfer position, and not transverse to the transport direction.

BRIEF DESCRIPTION OF THE FIGURES

Exemplary embodiments of the invention are described hereinafter, by reference to the drawings. The drawings show:

FIG. 8 a schematic representation of a second embodiment of a palletizing apparatus;

FIG. 9a a schematic representation of a third embodiment of a palletizing apparatus in a first position of the intermediate station, and FIG. 9b a second schematic representation of the palletizing apparatus from FIG. 9a, in an intermediate position of the supply stations.

DETAILED DESCRIPTION OF THE INVENTION

Figure 1:
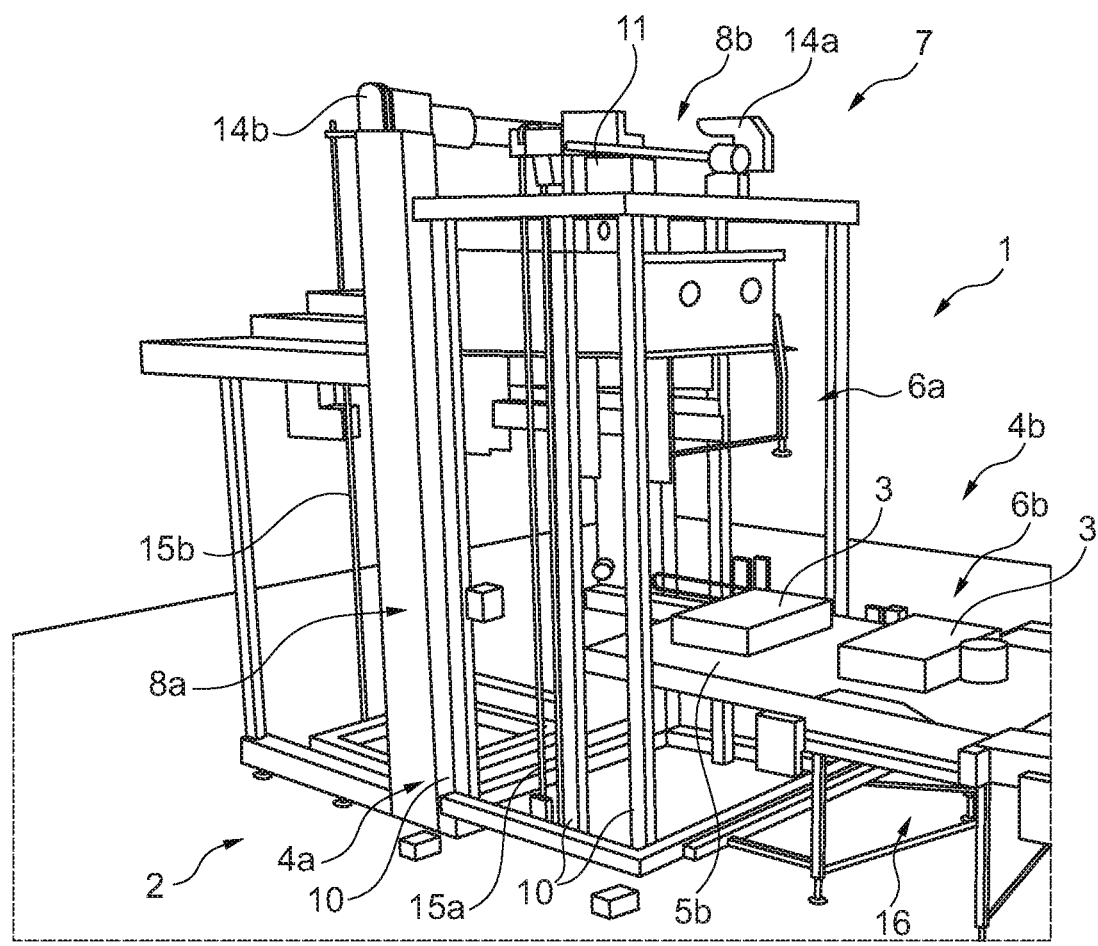
FIG. 1 A first perspective representation of a palletizing apparatus with two supply stations in a first position.
Figure 2:
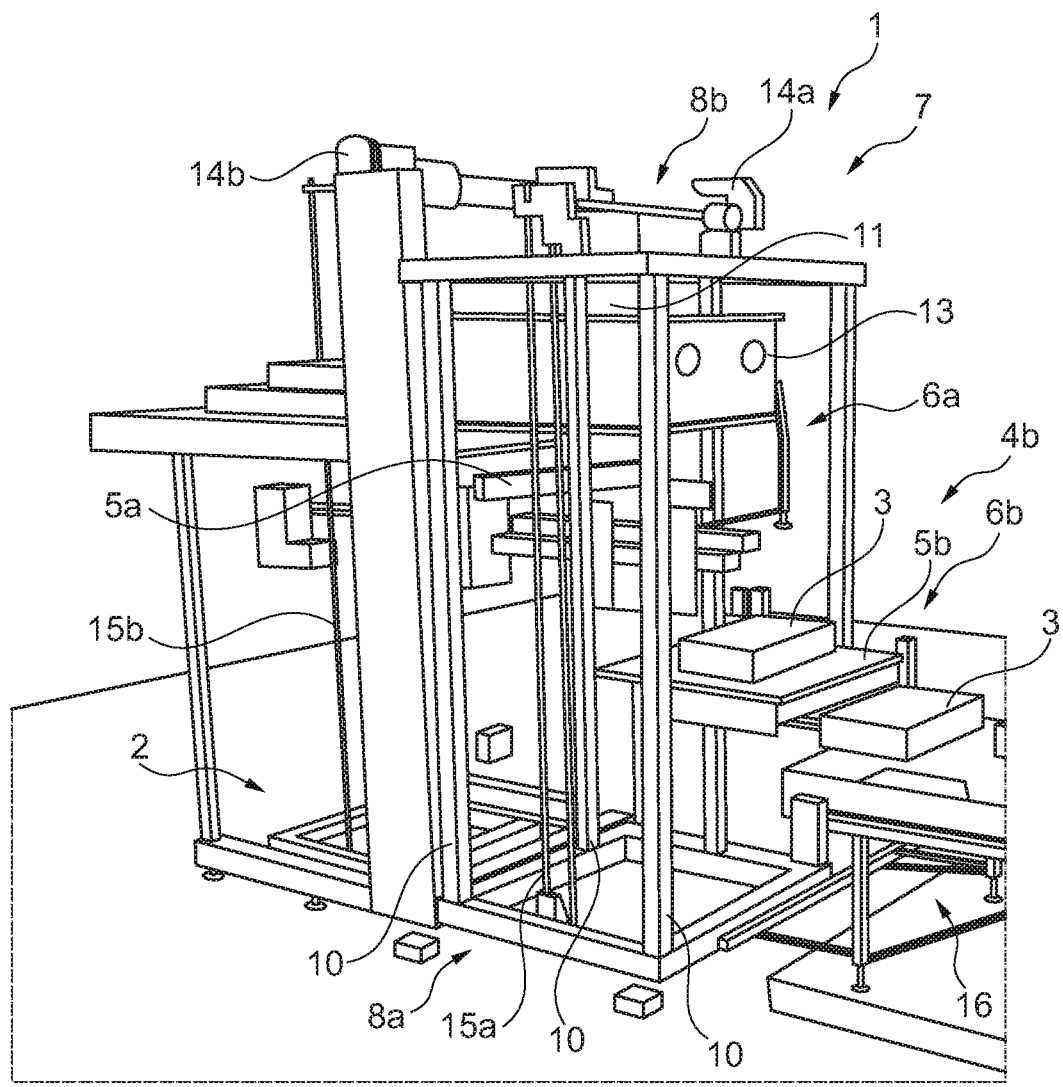
FIG. 2 a second perspective representation of the palletizing apparatus from FIG. 1 in a second position of the supply stations.
Figure 3:
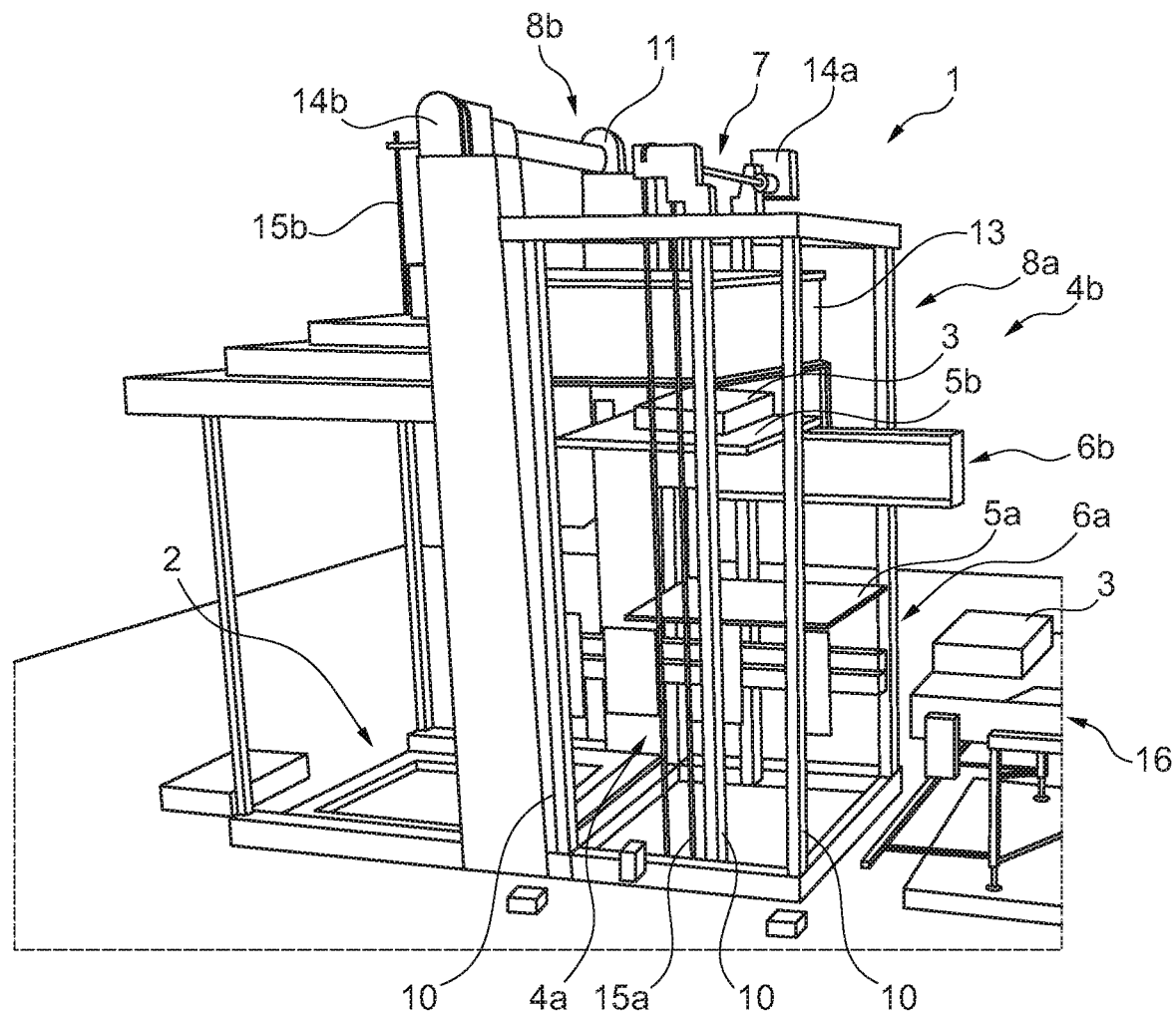
FIG. 3 a third perspective representation of the palletizing apparatus from FIG. 1 in a third position of the supply stations.
Figure 4:
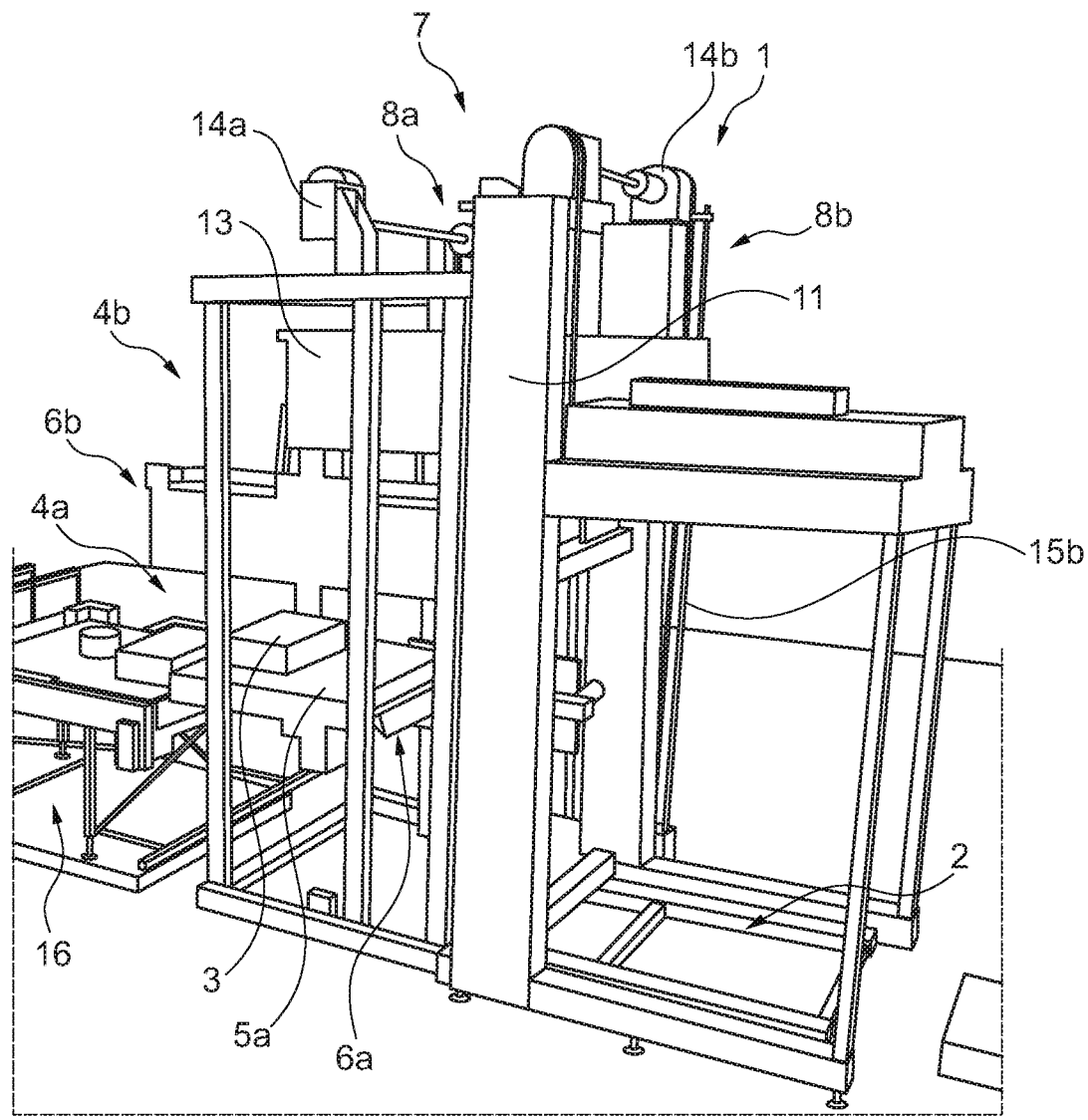
FIG. 4 a fourth perspective representation of the palletizing apparatus from FIG. 1 in a fourth position of the supply stations.
Figure 5:
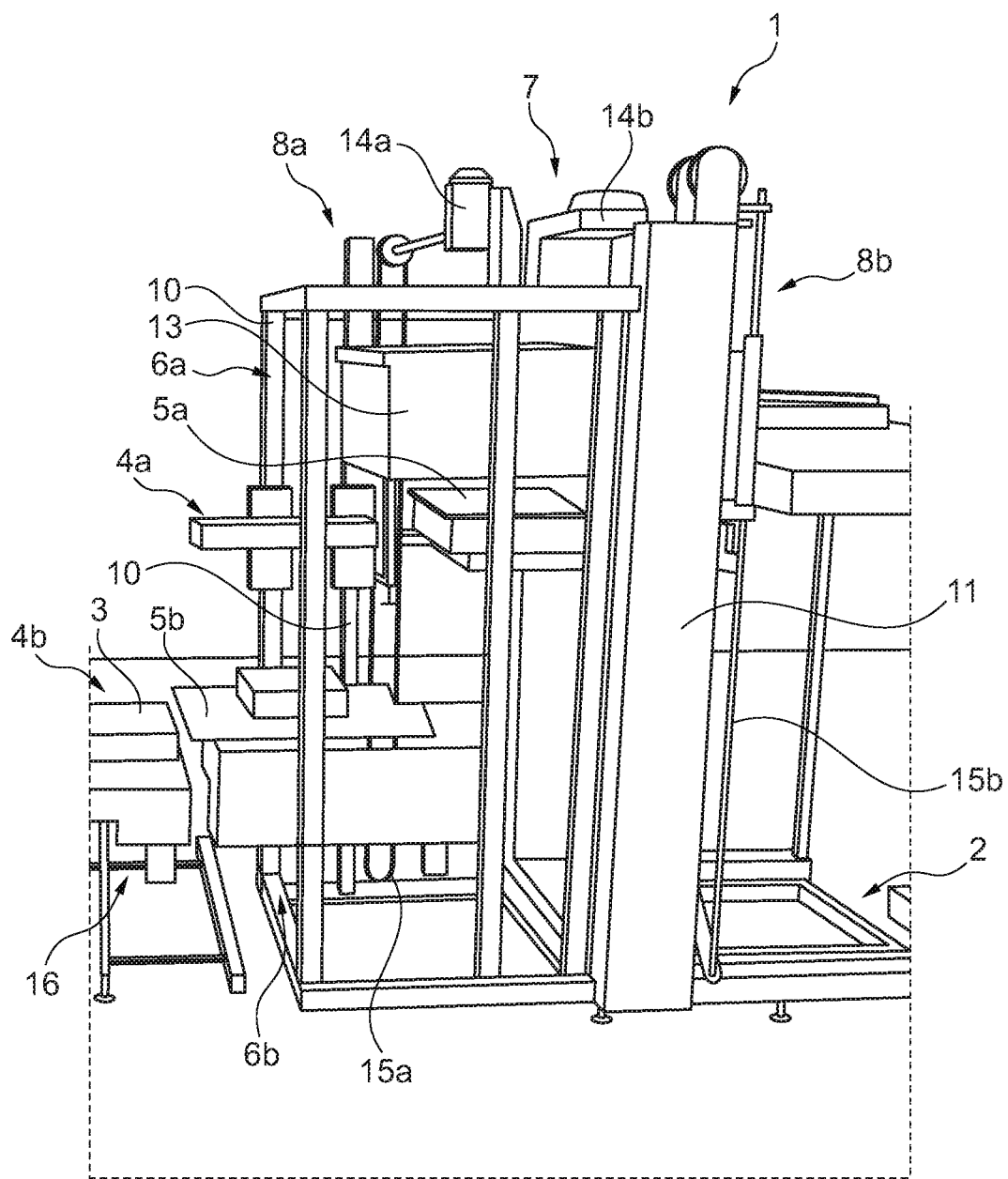
FIG. 5 a fifth perspective representation of the palletizing apparatus from FIG. 1 in a fifth position of the supply stations.
Figure 6:
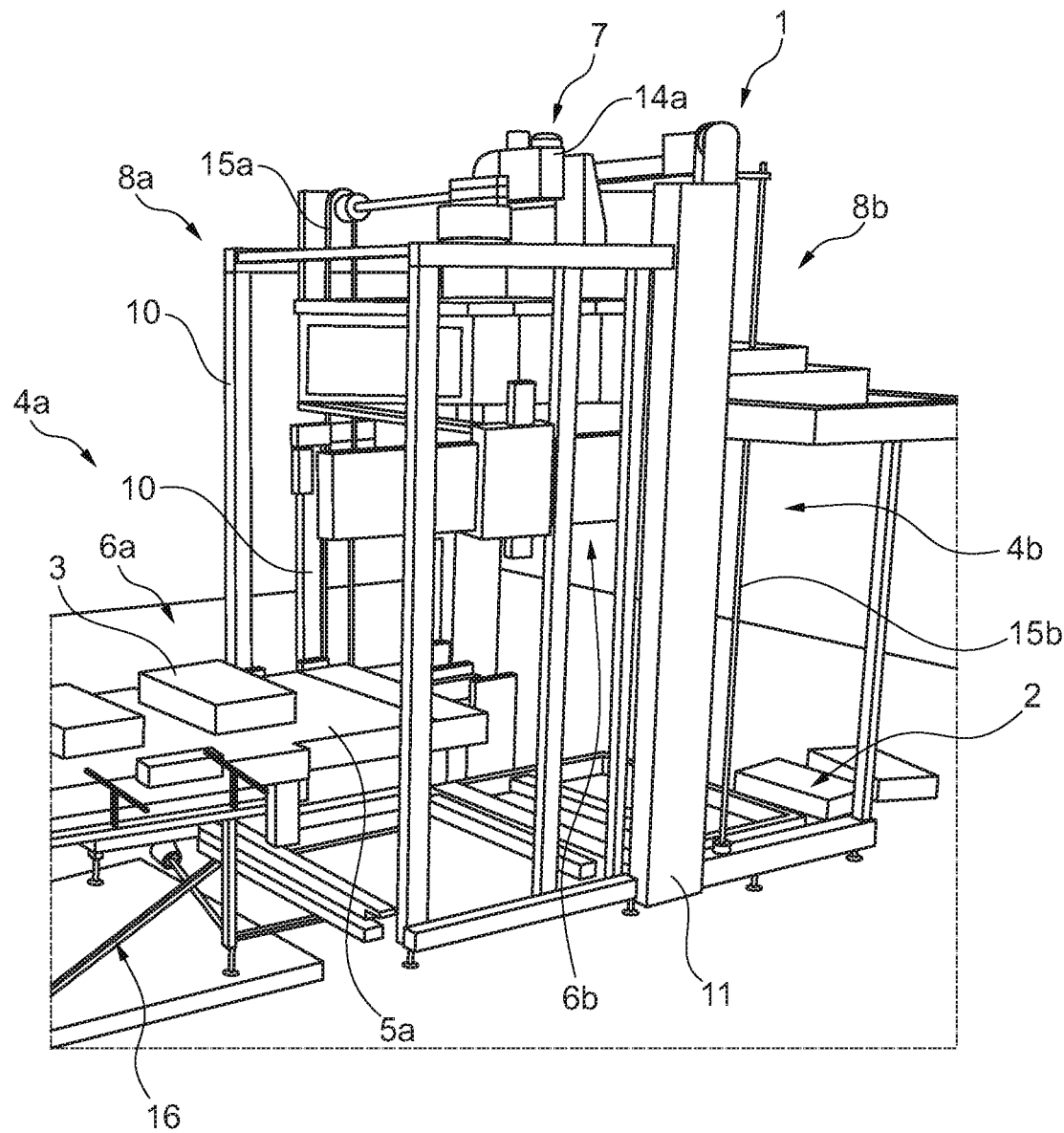
FIG. 6 a sixth perspective representation of the palletizing apparatus from FIG. 1 in a sixth position of the supply stations.

Represented in FIGS. 1-6 are different perspective views of a palletizing apparatus 1 in different positions of two supply stations 4a, 4b, with the intermediate carriers 5a, 5b at the supply stations, horizontally adjustable in the transport direction.

The palletizing apparatus 1 comprises a stacking location 2, at which packages 3, supplied by a transport unit 16, are stacked on one another, arranged, for example, on a load carrier formed as a pallet, not represented here. For the palletizing of the packages 3, i.e., for receiving the packages 3 at the transport unit 16 and arranging of the packages 3 on the stacking location 2, the palletizing apparatus 1 comprises two supply stations 4a, 4b, of which the intermediate carriers 5a, 5b, can be adjusted between a receiving position, in which these takes over the packages 3 from the transport unit 16, and a transfer position, in which the packages 3 are deposited at the stacking location 2. In the receiving position, the intermediate carriers 5a, 5b, are therefore arranged in relation to the transport unit 16 in such a way that a package 3, supplied by the transport unit 16, is received onto the intermediate carriers 5a, 5b. In the transfer position, the intermediate carriers 5a, 5b, are located opposite the stacking location in such a way that the packages 3 are deposited from the intermediate carriers 5a, 5b, on the stacking location 2.

For the vertical adjustment of the intermediate carriers 5a, 5b, the receiving devices 6a, 6b, comprising the intermediate carriers 5a, 5b, are arranged at separate column devices 8a, 8b, such as to be movable vertically. The column devices 8a, 8b comprise for this purpose carrier columns 10, 11, on which the receiving devices 6a, 6b, are mounted such as to be movable vertically between a high-level position, representing the end position, and a low-level position.

Accordingly, the carrying columns 10 serve to provide a vertically movable mounting for the receiving device 6a, wherein the vertical movement is put into effect by means of a drive unit 14a, which drives a chain 15a which is in operational connection with the receiving device 6a. The receiving device 6b is arranged so as to be movable horizontally, related to the transport direction of the packages 3, on the opposite side at a carrying column 11, wherein the drive for the receiving device 6b is provided by means of a drive unit 14b, which drives a chain 15b which is in engagement with the receiving device 6b. The vertical alignment of the intermediate carriers 5a, 5b, takes place both opposite the transport unit 16 as well as opposite the stacking location 2, and therefore by means of a vertical movement of the receiving devices 6a, 6b.

A horizontal movement of the packages 3 in the palletizing apparatus 1 takes place by a horizontal movement of the intermediate carriers 5a, 5b, which for this purpose are arranged, driven by a motor, at the receiving devices 6a, 6b, so as to be movable horizontally along the transport direction, starting from the receiving position in the direction onto the transfer position. After the packages 3 have been taken from the transport unit 16, at the transfer from the receiving position into the transfer position, as well as a vertical movement of the intermediate carriers 5a, 5b, a horizontal movement of the intermediate carriers 5a, 5b, also takes place, opposite the receiving devices 6a, 6b, until the intermediate carriers 5a, 5b, are arranged, as a supplement to their vertical position, also horizontally, in the transfer position. The intermediate carriers 5a, 5b, can be adjusted for this purpose in the horizontal direction between an end position and a starting position. In order to transfer the packages 3 from the intermediate carriers 5a, 5b, arranged in the transfer position, to the stacking location 2, the palletizing apparatus 1 comprises a clearing element, arranged on a frame 13, which moves the packages 3 from the intermediate carriers 5a, 5b, in the direction onto the stacking location 2.

The arrangement of the carrying columns 10, 11, opposite one another and mounted in each case on one side of the receiving device 6a, 6b, makes possible, as well as the horizontal movement of the intermediate carriers intermediate carriers 5a, 5b, at the receiving devices 6a, 6b, also the movement of the intermediate carriers 5a, 5b, simultaneously in opposite directions between the receiving position and the transfer position, without them colliding with one another. Any diversionary movement required is attained in this situation by means of a horizontal movement of the intermediate carriers 5a, 5b, which makes it possible for them to be moved past one another.

Figure 7:
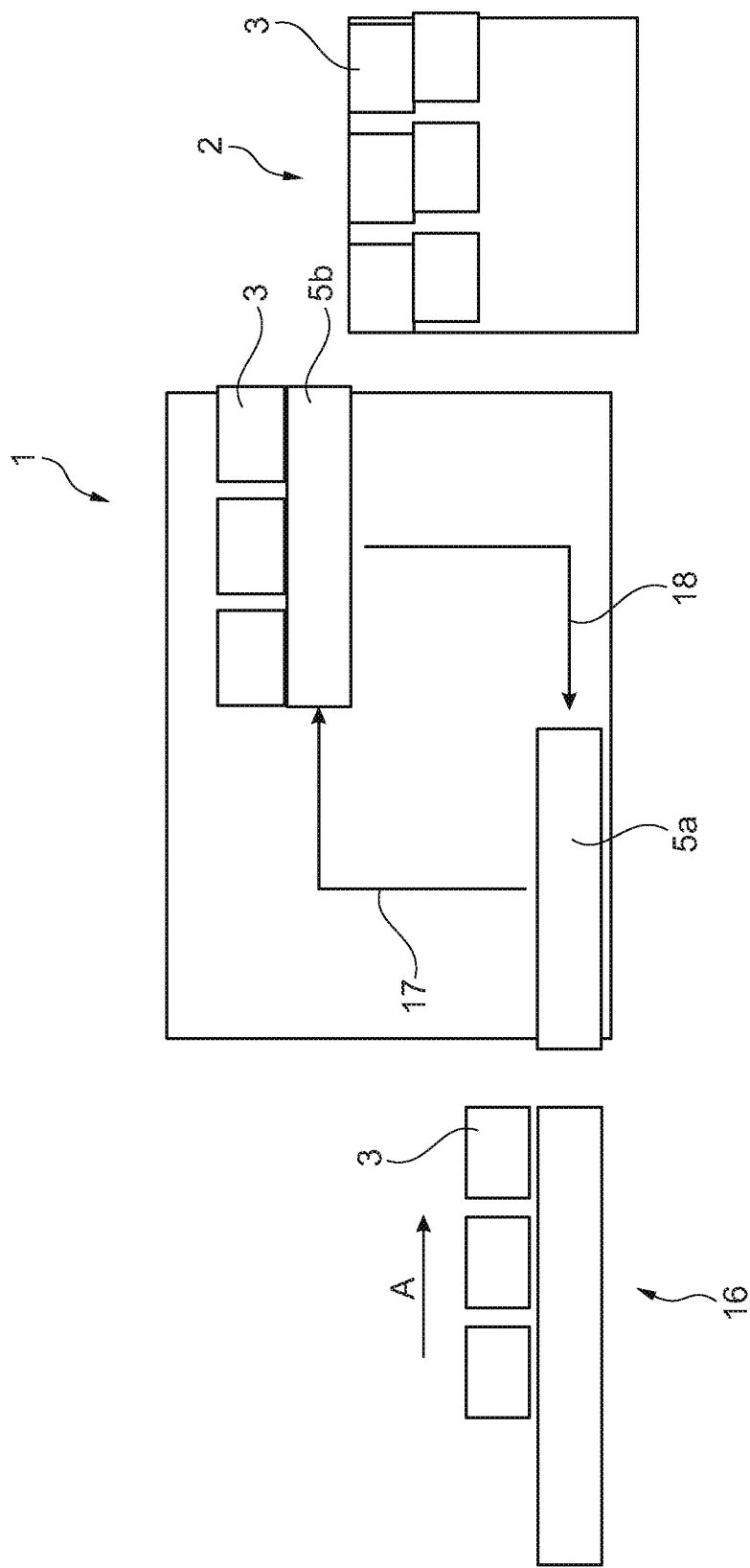
FIG. 7 a schematic representation of a first embodiment of a palletizing apparatus with an upstream transport station.

One possible configuration of a palletizing apparatus with collision-avoidance movement paths 17, 18, is represented in FIG. 7. In this situation, the intermediate carriers 5a, 5b, are moved on a first fixed movement path 17 out of the receiving position into the transfer position, and on a second movement path 18 out of the transfer position into the receiving position. According to this configuration, the intermediate carriers 5a, 5b, move on a circular path, with which the movement paths 17, 18, connect to one another and exhibit no points of intersection whatever.

An alternative configuration of collision-free movement paths 17, 18, is represented in FIG. 8. In this situation, the first intermediate carrier 5a moves on the first movement path 17 to and fro between the receiving position and the transfer position, while conversely the second intermediate carrier 5b moves to and fro on the second movement path 18 between the receiving position and the transfer position. According to this configuration, therefore, an individual movement path 17, 18, is assigned to each intermediate carrier 5a, 5b, for the movement between the receiving position and the transfer position.

Represented in FIGS. 9a and 9b is a further configuration of a movement of the intermediate carriers 5a, 5b, between their receiving position and transfer position, with which, in order to avoid a collision in an overlapping region of the movement paths 17, 18, provision is made between the receiving position and the transfer position for a horizontal compensation movement of the intermediate carrier 5a, moved out of the receiving position into the transfer position, such that no collision occurs between the intermediate carriers 5a, 5b.

With regard to the compensation movement, it is advantageous if the unladen empty intermediate carrier completes the compensation movement, and the laden intermediate carrier runs through the shortest possible travel route, ideally a travel route with as few changes of direction as possible. This variant is not represented.

REFERENCE NUMBER LIST

1 Palletizing apparatus
2 Stacking location
3 Package
4a, 4b Supply station
5a, 5b Intermediate carrier
6a, 6b Receiving device
7 Guide unit
8a, 8b Column device
10 Carrying column
11 Carrying column
13 Frame (for clearing element)
14a, 14b Drive unit
15a, 15b Chain
16 Transport unit
17 First movement path
18 Second movement path

The invention claimed is:

1. A palletizing apparatus for stacking packages on a load carrier, the palletizing apparatus comprising:
   a stacking location for palletizing the packages and
   at least two supply stations in conveying connection with said stacking location, each of said at least two supply stations having an intermediate carrier configured to receive the packages;
   said intermediate carriers being vertically adjustable by a motor drive at least in sections, independently of one another, between a low-level position and a high-level position;
   said intermediate carriers being horizontally adjustable by the motor drive independently of one another, between a starting position and an end position; and
   said intermediate carriers being arranged at said at least two supply stations for collision-free adjustment of said intermediate carriers, with opposed movement directions between a receiving position and a transfer position;
   each of said supply stations including a receiving device which is:
   configured to provide a movable arrangement of said intermediate carriers horizontally between the starting position and the end position; and
   arranged at a guide unit to be vertically movable between the low-level position and the high-level position of said intermediate carrier, and wherein said guide unit includes two separate column devices, each assigned to a respective receiving device and including at least one carrying column.

2. The palletizing apparatus according to claim 1, wherein said column devices are arranged opposite one another transversely to a transport direction.

3. The palletizing apparatus according to claim 1, wherein said carrying columns are arranged opposite one another transversely to a transport direction.

4. The palletizing apparatus according to claim 1, wherein said receiving devices comprise transfer devices for a horizontal movement of the packages opposite said intermediate carrier.

5. The palletizing apparatus according to claim 4, wherein said transfer devices comprise at least one of a transport belt or transport rollers arranged at said intermediate carrier.

6. The palletizing apparatus according to claim 5, wherein said transport belt and/or said transport rollers are connected to a drive unit.

7. The palletizing apparatus according to claim 5, wherein said transfer devices comprise a clearing element, adjustable parallel to said intermediate carrier and configured to be brought into engagement with a package arranged on said intermediate carrier.

8. The palletizing apparatus according to claim 7, wherein said clearing element is connected to a drive unit.

9. A method for stacking package on a loading carrier arranged at a stacking location, the method comprising:
   providing a palletizing apparatus according to claim 1;
   with the first intermediate carrier in the receiving position and the second intermediate carrier in the transfer position, conveying a package which may be present on the second intermediate carrier from the second intermediate carrier to the stacking location;
   placing a package on the first intermediate carrier; and
   subsequently driving the first intermediate carrier by motor drive in a direction towards the transfer position, and, simultaneously, moving the second intermediate carrier by motor drive in a direction towards the receiving position, and thereby moving the first and second intermediate carriers collision-free past one another.

10. The method according to claim 9, which comprises moving the intermediate carriers on a first movement path out of the receiving position into the transfer position, and on a second movement path out of the transfer position into the receiving position.

11. The method according to claim 10, wherein the first movement path and the second movement path do not overlap one another.

12. The method according to claim 10, wherein the first and second movement paths are congruent in a region at the transfer position and/or receiving position, and wherein the intermediate carriers are moved past one another free of collision in a region in between the congruent regions.

13. The method according to claim 10, which comprises:
   moving the first intermediate carrier on a first movement path out of the transfer position into the receiving position and also out of the receiving position into the transfer position; and moving the second intermediate carrier on a second movement path out of the transfer position into the receiving position and also out of the receiving position into the transfer position;

wherein the first and second movement paths do not have any points of intersection.

14. A palletizing apparatus for stacking packages on a load carrier, the palletizing apparatus comprising:

a stacking location for palletizing the packages and at least two supply stations in conveying connection with said stacking location, each of said at least two supply stations having an intermediate carrier configured to receive the packages;

said intermediate carriers being vertically adjustable by a motor drive at least in sections, independently of one another, between a low-level position and a high-level position;

said intermediate carriers being horizontally adjustable by a motor drive independently of one another, between a starting position and an end position;

said intermediate carriers being arranged at said at least two supply stations for collision-free adjustment of said intermediate carriers, with opposed movement directions between a receiving position and a transfer position;

said receiving devices including transfer devices for a horizontal movement of the packages opposite said intermediate carrier, said transfer devices having at least one of a transport belt or transport rollers arranged at said intermediate carrier.

\* \* \* \* \*